United States Patent
Ahern et al.

(10) Patent No.: US 6,388,658 B1
(45) Date of Patent: May 14, 2002

(54) HIGH-END KVM SWITCHING SYSTEM

(75) Inventors: Steven M. Ahern; John Curran; Colm Egan, all of Clare (IE); Stefan Langejurgen, Vlotho/Exter (DE); Anton Lischewski, Halle (DE); Klaus Malinowski, Essen (DE); Andreas Patzelt, Bunde (DE); Andreas Szczepanek, Bielefeld (DE); Charles H. Williams, Limerick (IE)

(73) Assignee: Cybex Computer Products Corp., Huntsville, AL (US)

( * ) Notice: Subject to any disclaimer, the term of this patent is extended or adjusted under 35 U.S.C. 154(b) by 0 days.

(21) Appl. No.: 09/452,449

(22) Filed: Dec. 2, 1999

(30) Foreign Application Priority Data

May 26, 1999 (IE) .............................................. S990431

(51) Int. Cl.[7] .................................................. G09G 5/00
(52) U.S. Cl. ........................................ 345/168; 345/1.1
(58) Field of Search .................................. 345/168, 169, 345/170, 171, 156, 157, 1.1, 1.2, 2.1, 2.2, 2.3, 3.1, 3.2, 3.3, 3.4, 4, 5; 341/20, 22, 23

(56) References Cited

U.S. PATENT DOCUMENTS

| 4,939,509 A | * | 7/1990 | Bartholomew et al. ...... 345/1.1 |
| 5,214,421 A | * | 5/1993 | Vernon et al. ............... 345/1.1 |
| 5,499,377 A | | 3/1996 | Lee |
| 5,721,842 A | | 2/1998 | Beasley et al. |
| 6,069,615 A | * | 5/2000 | Abraham et al. ............ 345/2.2 |

* cited by examiner

Primary Examiner—Xiao Wu
(74) Attorney, Agent, or Firm—Nixon & Vanderhye PC

(57) ABSTRACT

The present invention relates to a switching system for interconnecting a plurality of computer user terminals or workstations each having user interface devices, including a keyboard, a video display unit, and a cursor control device or mouse (KVM), with a plurality of computers in a computer network, allowing a user to access any one or more of said computers from the user interface devices of a single terminal or workstation. It is denoted "high end" because of the potentially large number of computers which may be interconnected with the system.

31 Claims, 12 Drawing Sheets

S = Signal (702)
G = Analogue Gnd. (701)

HIGH-END KVM SWITCHING SYSTEM

FIELD OF THE INVENTION

The present invention relates to a switching system for interconnecting a plurality of computer user terminals or workstations each having user interface devices, including a keyboard, a video display unit, and a cursor control device or mouse (KVM), with a plurality of computers in a computer network, allowing a user to access any one or more of said computers from the user interface devices of a single terminal or workstation. It is denoted "high end" because of the potentially large number of computers which may be interconnected with the system.

BACKGROUND AND SUMMARY OF THE INVENTION

A keyboard-video-mouse (KVM) switching system for selectively interconnecting a single workstation with a plurality of remotely located computers, a "low-end" system, is described for example in U.S. Pat. No. 5,499,377 (Designed Enclosures, Inc.) and such systems are available from Cybex Inc., and other suppliers. "High end" KVM systems, in which multiple workstations may be selectively interconnected with any one of multiple computers via a computerized switching hub are available from, inter alia, Cybex Inc., Apex PC Solutions Inc., Rose Electronics Inc., Lightwave Communications Inc., C-C-C Group Limited. These systems greatly facilitate system administration in a local area network from a single workstation, which may be located in a different room or building from interconnected computers such as servers in a large client server network. Interconnecting cabling needs are also reduced. A typical high end KVM switching system is described in U.S. Pat. No. 5,721,842 (Apex). Signal conditioning interface units receive keyboard and mouse signals from a workstation and generate serial digital data packets which are transmitted to a switching hub comprising a central crosspoint switch. The crosspoint switch routes the keyboard/mouse packet to another signal conditioning interface unit coupled to the selected remote computer. Analogue video output signals from the remote computer are transmitted via central analogue crosspoint switching arrangement to the workstation, so that it appears to the workstation user that there is a direct connection between the workstation keyboard, video monitor and mouse to any one of 32 remotely-located computers. The switching hub comprises a master Central Processing Unit (CPU), a plurality of identical transmit/receive cards, a plurality of switch cards each comprising a 16×16 digital crosspoint switch and a separate 16×16 analogue crosspoint switch, a digital backplane and a separate analogue backplane. Such a system has to be powered down for removal or upgrading of cards, and a failure on one switch card or in the master CPU will cause the whole system to fail. In contrast, the present invention provides a high end KVM system with distributed control, i.e. without a master CPU, and in which all cards and components are "hot-swappable," a significant advantage which allows for simple maintenance and updating of the system to interconnect more workstations and computers, without any system down time.

U.S. Pat. No. 5,884,096 (Apex) describes a similar high end KVM switching system.

The present invention provides a switching system for interconnecting a plurality of computer user terminals (1–16), having user interface devices including a keyboard (1b), a video display unit (1a) and a cursor control device (1c), with a plurality of computers (201–328) in a computer network, allowing a user to access any one or more of said computers from the user interface devices or a single terminal, comprising a switching hub (40) for routing keyboard and cursor control signals transmitted from any one (1) of the terminals (1–16) to a selected computer (201), and for routing video signals received from the said computer to said one of the terminals, said signals being in both digital and analogue form, a user interface module (17–32) for receiving said transmitted keyboard and cursor control signals, coupled between said plurality of computer user terminals (1–16) and said switching hub (40), a computer interface module (51–178) for receiving said received video signals, coupled between said plurality of computers (201–328) and said switching hub (40), characterized in that the physical architecture of the switching hub (40) is a modular system comprising a plurality of switch modules (41), each module comprising an analogue transmitter (43) circuit and/or an analogue receiver (42) circuit, each including an analogue crosspoint switching arrangement, a programmable digital circuit (44) for handling digital data signals and including a digital crosspoint switching arrangement, and a backplane (45) interface between the said analogue (42, 43) and digital (44) circuits.

In another aspect, the invention provides a switching hub (40) comprising a plurality of removable and hot swappable switch modules (41) each with its own crosspoint switching arrangement (402, 501, 502) and central processing unit (400), each module comprising an analogue transmitter (43) circuit and/or an analogue receiver (42) circuit, a programmable digital circuit (44) for handling digital data signals and a backplane (45) interface between the said analogue (42, 43) and digital (44) circuits.

In a further aspect, the invention provides a switching hub (40) comprising a crosspoint switching arrangement (402, 501, 502), including an analogue crosspoint switch (501, 502) with a switch topology based on a switched transconductance architecture.

In a still further aspect, the invention provides a switching hub (40) which is a modular system comprising a plurality of switch modules (41), each module comprising a separate analogue transmitter (43) circuit or an analogue receiver (42) circuit, each including an analogue crosspoint switching arrangement, a separate programmable digital circuit (44) for handling digital data signals and including a digital crosspoint switching arrangement, and a backplane (45) interface between the said analogue (42, 43) and digital (44) circuits, said analogue circuit embodying stripline structures for video bus channel paths.

The invention also provides methods of switching KVM signals in a KVM system, using the system described, and in the manner as herein set forth.

Modular System

In its preferred embodiment, the invention creates a truly modular system, which is very easily scaleable to the desired system, in terms of connecting more users and computers as needs change, by simply adding more modules to the system. This is achieved by providing switch modules, or packs of cards, for transmit and receive modes, providing access to a pre-determined number of user- or computer interfaces of the system. In the described embodiment, a system is provided where each switch module can handle sixteen video channels, and with nine modules loaded, the system will allow sixteen users to control 128 computers in a non-blocking way.

Economic System Architecture

In its preferred embodiment, the invention reduces costs of design and manufacture by splitting each switch module into an analogue card and a digital card, wherein the digital card is a common card which may be used interchangeably for both transmit and receive modes, i.e. bundled either with an analogue receiver or transmitter card.

Hot Swap

In its preferred embodiment, the invention provides a fully "hot-swappable" modular KVM system. Every single removable module in the system may therefore be hot swappable, i.e. may be plugged or unplugged in a powered on condition. This includes; power-supplies, fan modules, all cards, control panel.

CAN-bus as Internal Communication

In its preferred embodiment, the invention provides communication between all cards based on a Controller Area Network (CAN) bus, for example; all switching information, system information, update information for the main CPU, update information for the programmable logic devices, control information.

Synchronization Signals

Whereas the analogue cards are for distributing video signals, the preferred embodiment of the invention provides a digital card for handling vertical and horizontal synchronization signals (HS and VS) exclusively for the video channel, and the external communication. VS and HS signals are not encoded onto the analogue color video signals (e.g. green and blue) as in the prior art, U.S. Pat. No. 5,884,096 (Apex).

Video Quality

In its preferred embodiment, the invention improves transmitted video signal quality, without any loss of quality when a large number of computers are connected to the system. This is achieved by a combination of features, a common object of which is to preserve the integrity of the video signals and minimize crosstalk at every stage during transmission through the system, to avoid for instance "ghosting" on screen from interference of other video channels in the system. These features include, but are not limited to the following:

Choice of Crosspoint Switch

An analogue crosspoint switch topology based on "switched transconductance architecture" is preferred over the more common "bilateral mosfet (or CMOS) switch" type of device, described for instance in U.S. Pat. No. 5,884,096 (Apex). In the described embodiment of the present invention, the particular crosspoint switch used consists of an array of 128 transconductance input stages organized as eight 16:1 multiplexers with a common, 16-line analogue input bus. Each multiplexer is basically a folded-cascode high-speed voltage feedback amplifier with sixteen input stages. This architecture results in a low-power, large matrix crosspoint switch with high input resistance, low input capacitance and wide bandwidth without the use of additional input buffers. Bi-lateral mosfet (or CMOS) switches on the other hand suffer from significant parasitic capacitance and finite ON resistance since they are not internally buffered. This reduces overall bandwidth and causes variation in bandwidth as outputs are added or removed from a driving input.

Backplane Design

Controlled impedance "tripline" techniques have been used in the design of the analogue video bus portion of the backplane in order to optimize signal integrity, channel bandwidth and crosstalk separation. Adjacent channel crosstalk separation is enhanced by interleaving adjacent channel paths in an alternate tri-plate stnipline structure. i.e. all even channels are carried in one stripline structure and all odd channels are carried in an other. Expanding on the above technique additional stnipline structures may be used to further enhance the separation between channels thus further improving the crosstalk separation.

Backplane Interconnect Design

In order to maintain maximum system bandwidth and optimal crosstalk separation, special consideration has been given to the design of interconnectors at the backplane. A specific pin assignment is used with the connector array in order to minimize the crosstalk separation between channels, in a technique which creates a pseudo-coaxial cavity for each analogue signal path within the mated connector body thereby resulting in optimal crosstalk separation. In the embodiment described, a suitable connector for this technique is from the HDM plus range manufactured by Teradyne, Inc.

Additional Noise Reduction Measures

In order to reduce conducted noise from the digital portion to the analogue circuits, galvanic isolation has been incorporated in all interface paths between the digital card and the analogue card. This has been achieved through the use of optocouplers in all digital signal paths between the analogue printed circuit board (PCB) and digital PCB. In the embodiment described, a suitable optocoupler is part HCPL-0531, supplied by Hewlett Packard, Inc.

Redundant Power Supplies

In its preferred embodiment, the invention provides a KVM switching system with a fully redundant power supply, having at least two independent power supply systems. If one power supply fails, the other one will guarantee a stable system which will go on working without interruption.

FPGA Crosspoint Switch Arrangement

In its preferred embodiment, the invention provides a programmable logic device, such as a field programmable gate array (FGPA) for switching the synchronization signals. In the described embodiment, there are advantageously two bi-directional 16 by 16-crosspoint switches, both switched simultaneously for distributing horizontal and vertical synchronization signals always together on one channel. These crosspoint switches are preferably controlled by the main CPU. The logic device is preferably accessed by a data bus, an address bus and some control signals. This interface may be compatible to a standard microcontroller interface or a serial control link. This device is preferably programmable from the main CPU of the system. Advantageously, it is adapted to be automatically updated when the firmware of the CPU is updated.

Low Voltage Differential Transceiver (LVDS) Backplane Drivers

Differential LVDS drivers/receivers are used for the backplane. This reduces electromagnetic interference (EMI) and reduces crosstalk to other signals.

Remote Firmware Update

Advantageously, all programmable electronic devices may be reprogrammed or updated from a remote location. Alternatively, updates could be performed by computers with a serial, parallel, LAN, Internet, Infra-red and radio controlled transmission. The system could be configured via Internet.

System Monitoring Via Control Panel

Advantageously, the control panel may be used for updating the whole system. The update information is distributed via the CAN bus internally and the external command bus distributes this information to other switch modules. It is possible to update cards in other units connected to the system. Another advantageous use of the control panel is to configure the system and do administrative work, including debugging the system.

Single Unshielded Twisted Pair (UTP) Category 5 (CAT5) Cable Transmission

A single CAT5 transmission cable may be used to interconnect workstation and computer interfaces to the KVM switching system hub. Such a cable is of known construction, e.g. as described in U.S. patent applications Ser. Nos. 60/043,085, 60/045,608, 09/073,178, 08/971,223, 08/971,224, all assigned to Cybex Inc.

Flash Upgradable Firmware

Firmware in the system is preferably flash memory upgradeable. The system starts up from a boot ROM/EPROM and looks for a newer firmware version in the flash memory. If there is a newer version, the system executes commands from the flash memory.

BRIEF DESCRIPTION OF THE DRAWINGS

These, as well as other objects and advantages of this invention, will be more completely understood and appreciated by careful study of the following more detailed description of a presently preferred exemplary embodiment of the invention taken in conjunction with the accompanying drawings, of which.

DETAILED DESCRIPTION OF THE DRAWINGS

Figure 1A:
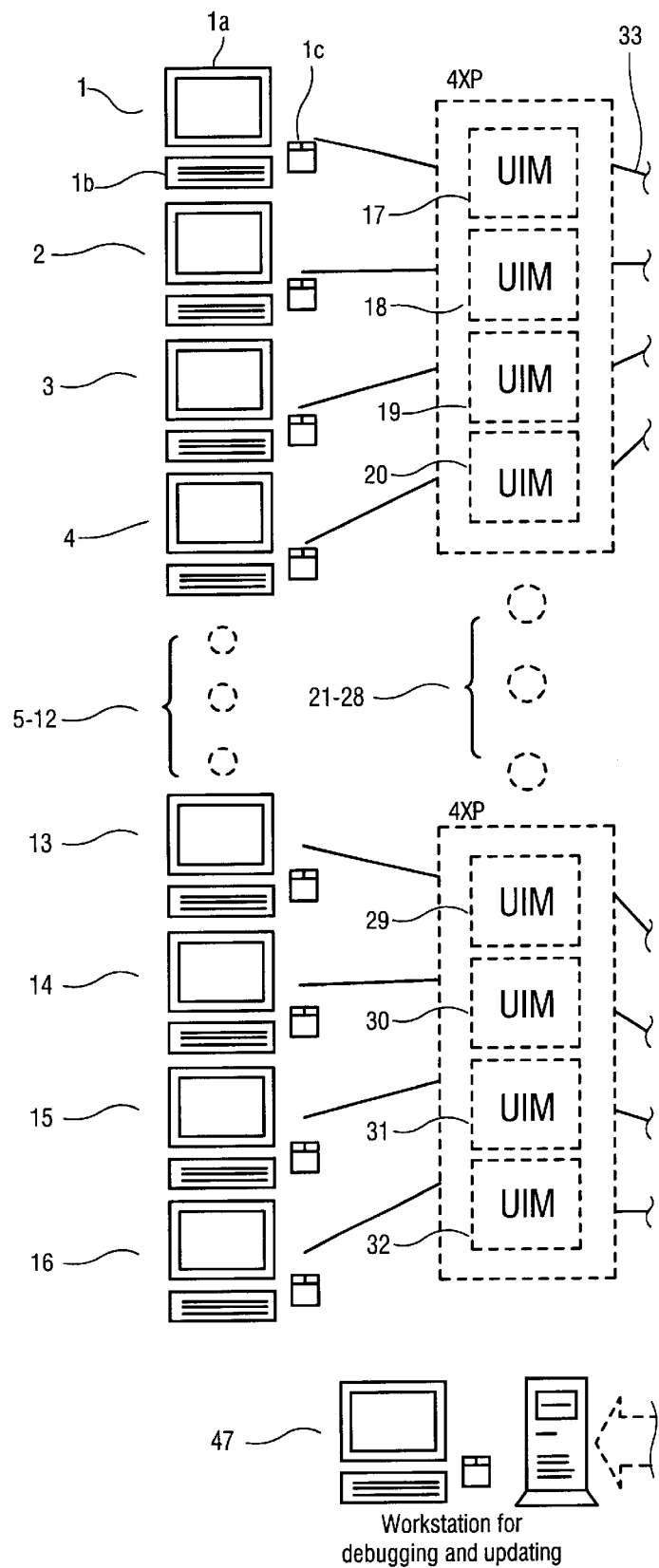
FIGS. 1A-1C are together a schematic representation of a high end KVM switching system in accordance with an embodiment of the present invention in which sixteen user workstations are connected with 128 computers.
Figure 1B:
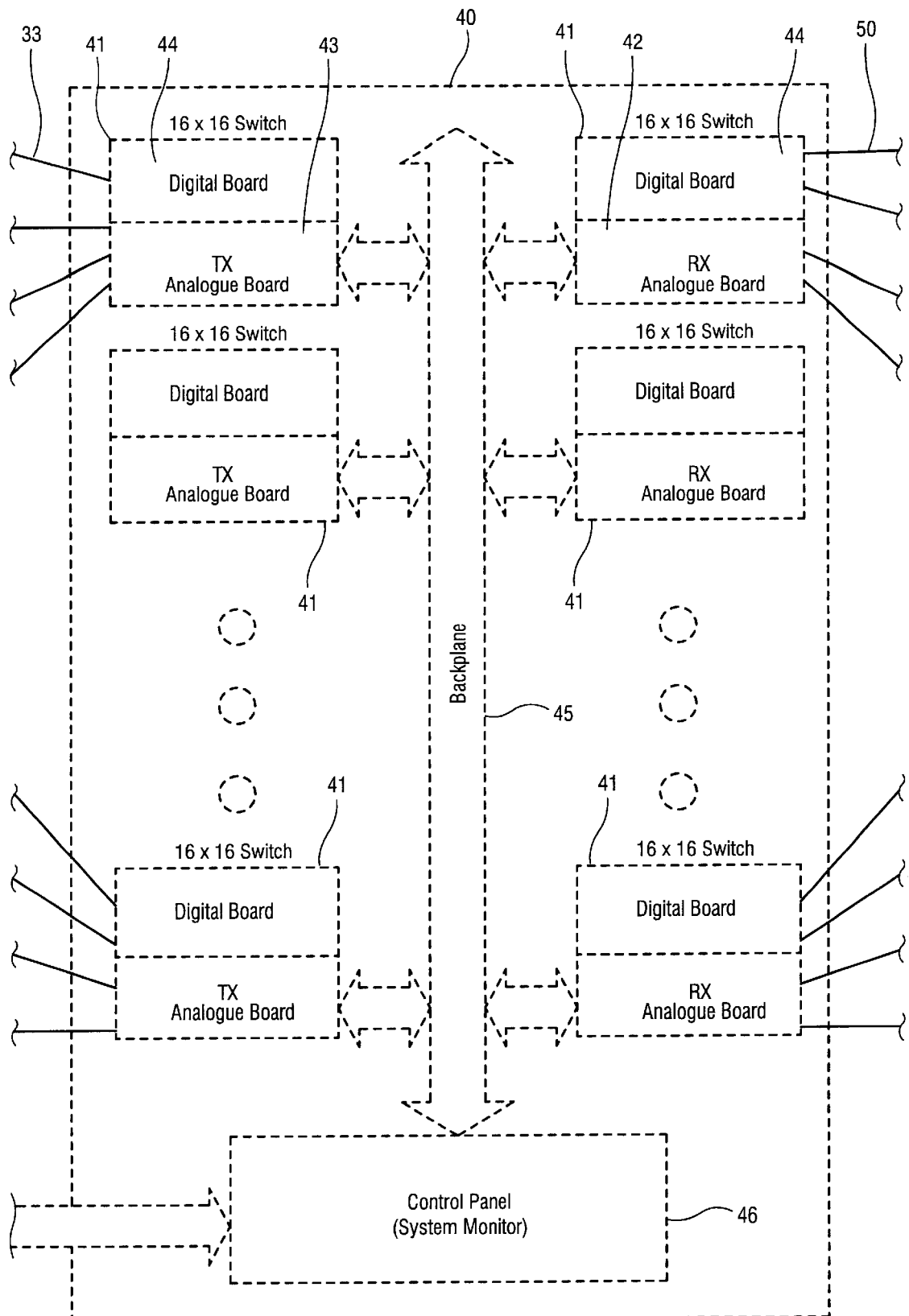
Figure 1C:
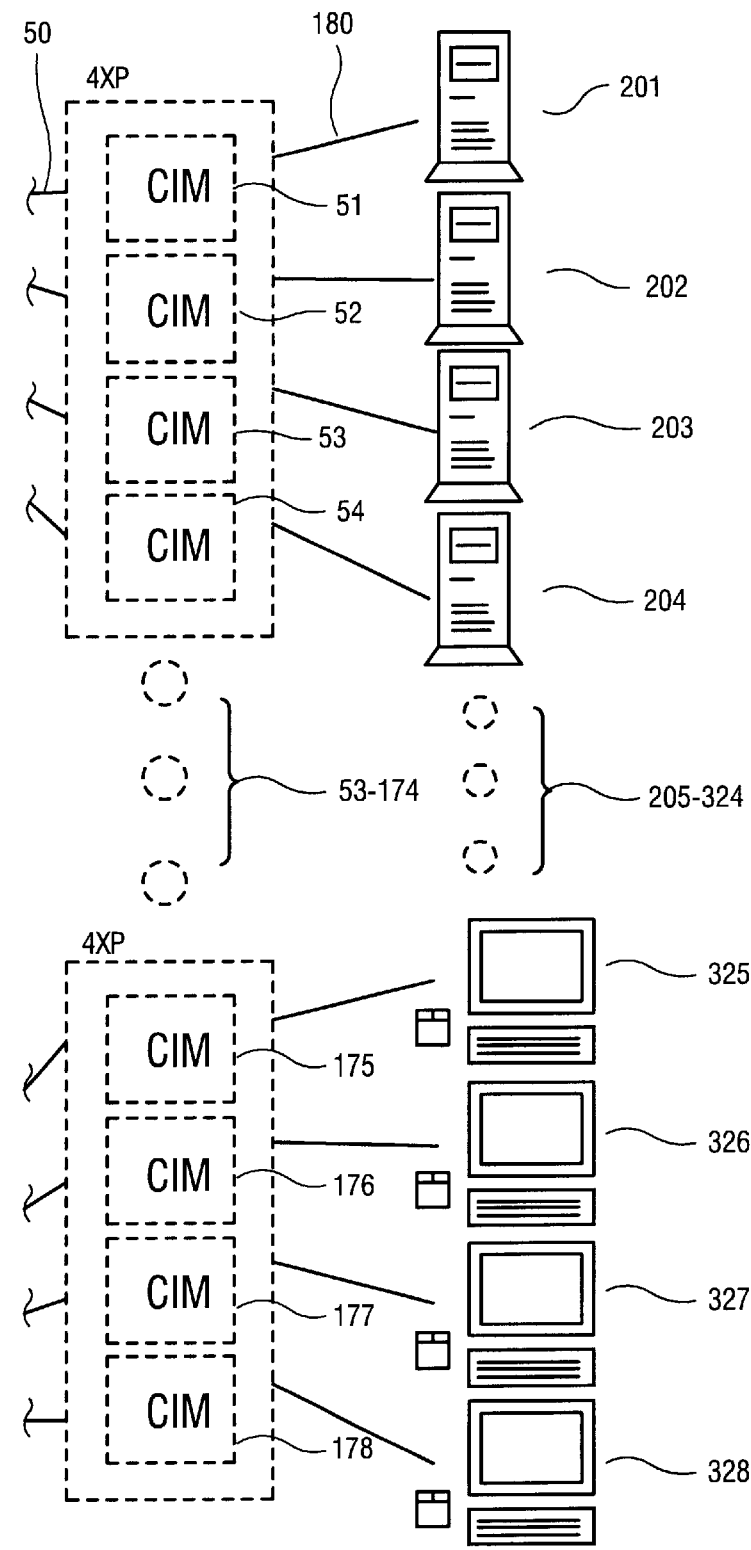

FIG. 1 shows the high end KVM ("Keyboard-Video-Mouse") computerized switching system or crosspoint switch according to the present invention, which allows a large number of computers to be coupled to a number of user terminals or workstations. In the embodiment shown, 128 computers (201–328) are interconnected with sixteen workstations (1–16), all computers being accessible from any one of the workstations, which may be remotely located in another room or building, for example. Each workstation (1–16) comprises a user interface including a video monitor (1a), a keyboard (1b) and a cursor control device such as a mouse (1c). Workstation input signals from the keyboard and the mouse are received by a user interface module (17–32), for example, a known system called 4xP, by Cybex Computer Products International Ltd.

The user interface module (17), packs and transmits/receives the bi-directional keyboard and mouse data signals over a communication link (33) to/from a switching hub (40). After being routed through the switching hub, the keyboard and mouse signals are retransmitted on another communication link (50) to a computer interface module (51) which is connected to a remotely-located computer (201). The computer interface module may also of known design, preferably a Cybex 4xP. The computer interface module separates and unpacks all the different types of data again and supplies the keyboard and mouse signals through appropriate connectors (180) to the input ports of the computer. The computer interface module acts like a keyboard and mouse connected to the computer even when communication with the workstation system is lost. The emulation of keyboard and mouse at the computer interface module also lets the computer boot without error messages and failures.

The switching information needed for the switching hub switch is usually generated in the user interface module (17). The information is provided to the switching hub (40) by the communication link (33), which already carries the mouse and keyboard data signals.

Analogue video signal output produced by the remote computer (201) is transmitted along the communication link (50) to the switching hub (40). This is then routed through the switching hub (40) and retransmitted to the user interface module (17), which provides the video signals to the monitor (1a).

Synchronization signals, horizontal sync (HS) and vertical sync (VS) associated with the analogue video signals (e.g., red, green, blue), are transmitted to the switching hub (40), routed through the crosspoint switch arrangement, and then retransmitted to the user interface module (17). The user interface module then provides the synchronization signals to the monitor (1a).

From a user's perspective, the monitor (1a), keyboard (1b) and mouse (1c) appear as if they are directly connected to the remote computer (201).

The Switching Hub

Figure 6:
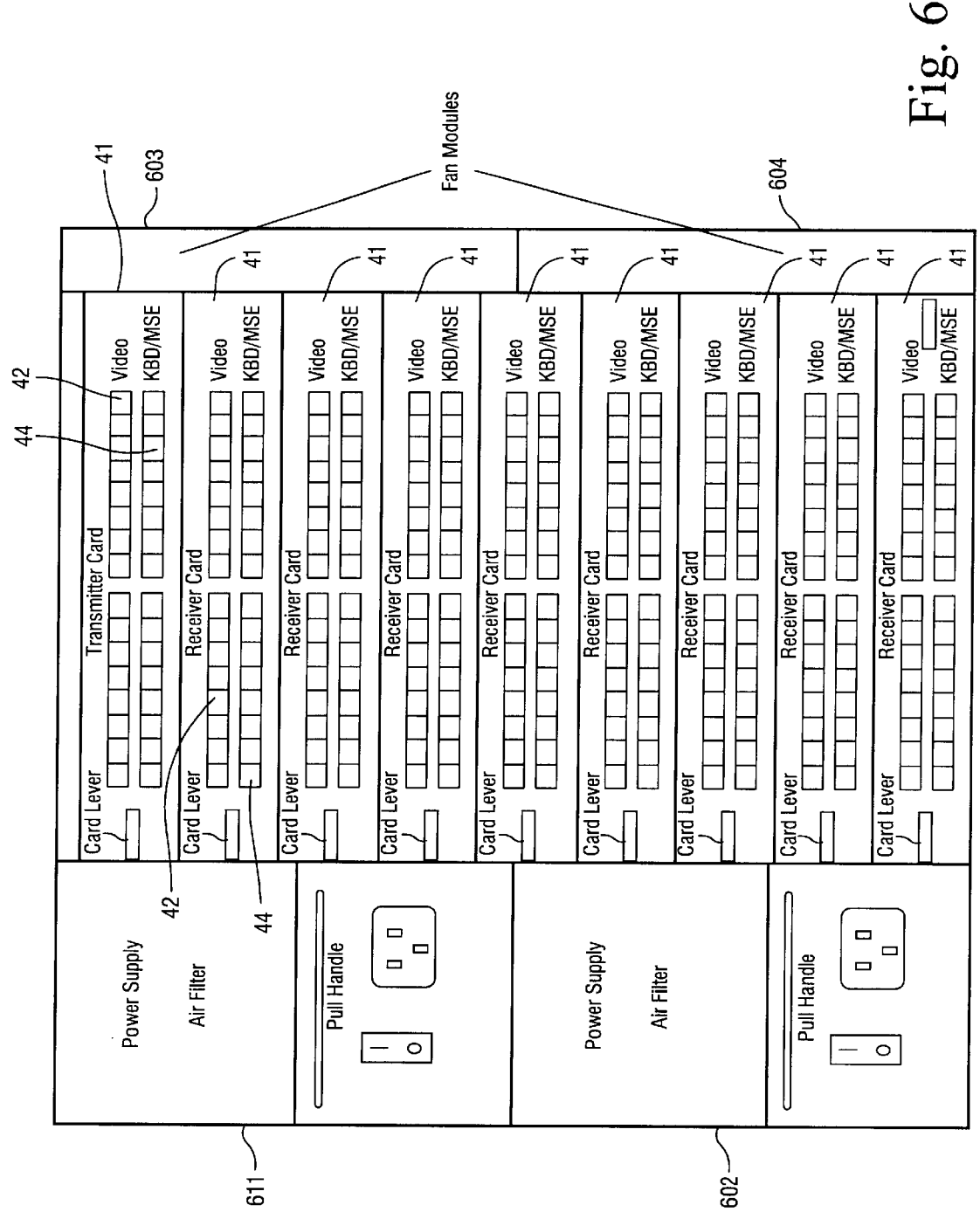
FIG. 6 is an end view of the rear panel of the switching hub unit shown in FIGS. 1A-1C.

FIG. 1 also shows in general outline a block diagram of the switching hub (40), which has many novel features in accordance with the present invention. This is easily scalable to the needed system, because of its physical modular architecture. Switch modules (41) fitting within individual racks in the switching hub (see FIG. 6) housing each provide access either to sixteen user interface modules (17–23) or sixteen computer interface modules (51–67) of the system. Each switch module is split into an analogue card (42, 43) and a digital card (44), in a back to back configuration. The switch modules are not all identical, and may be configured either as a receive module (42, 44) or as a transmit module (43, 44). The digital card (44) is most preferably common for both types of switch module, which reduces design and manufacturing costs. The analogue card is either an analogue receiver (42) or analogue transmitter (43), adapted respectively to distribute incoming or outgoing video signals from the switching hub (40). A combined analogue receiver/transmitter card is possible. The digital card handles video synchronization signals, the external communication, and the control signals for the analogue cards. Control signals coming from the digital card and going to the analogue card are isolated with opto couplers.

There are therefore sixteen video channels per switch module (41), in the embodiment described. The number of users or computers could be increased with every module (41) by steps of sixteen. This system will allow sixteen users to control 128 computers in a non-blocking way. It is also possible to have more than sixteen user interfaces connected to the switching hub. Additionally, it must be noted, more than one user can be connected to the same computer.

Figure 2:
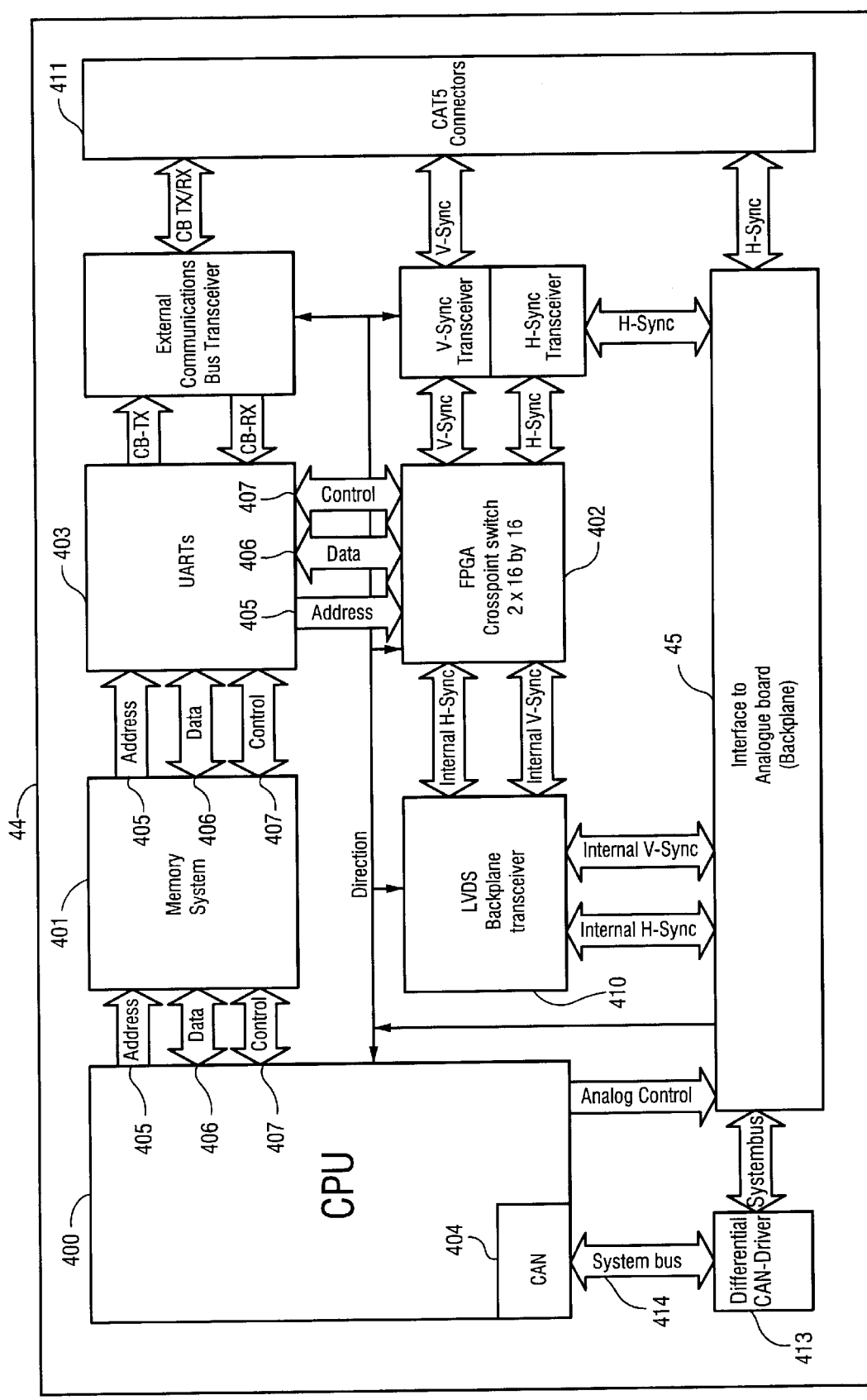
FIG. 2 is a block diagram of a common digital card, transmitter or receiver, comprised in a switch module of the system shown in FIGS. 1A-1C.

Every switch module includes a sixteen by sixteen digital crosspoint switch arrangement (see FIG. 2) and has access to sixteen channels on a backplane (45). A "channel" comprises different lines for each of the following signals: analogue video red, analogue video green, analogue video blue, a pair for vertical synchronization (VS) and a pair for horizontal synchronization (HS). Communication between the cards is performed on an internal communication bus. This communication is based on a differential CAN (controller area network) bus (404). For example, information sent on the CAN bus may be keyboard information, mouse information, switching information, system information, update information for the main CPU, update information for the programmable logic devices, control information.

Control Panel

A control panel (46) may be used for updating the whole system. The update information is distributed via the CAN bus internally to other plugged cards and the external communication bus distributes this information to other units, for example user interface modules or computer interface modules. Another use of the control panel is to configure the system and do administrative work. The control panel could also be used for debugging the system, e.g. from workstation (47).

Digital Card

As mentioned above one switch module (41) consists of a digital card (44) and one analogue transmitter (43) or receiver (42) card. The CPU (400) (central processing unit) shown in FIG. 2 controls both cards, the digital and the analogue card. The analogue card either transmits, or receives and switches the analogue video signals. In contrast to this the digital card controls and distributes the digital data signals, which are necessary for mouse, keyboard and monitor switching. A defined interface controls the analogue card.

Central Processing Unit (CPU) and Memory

Distributed control is provided by a separate stand alone CPU and memory on each digital card. The CPU (400) on the digital card is, for example, a sixteen bit CMOS microcontroller (C167) from Siemens A.G. It uses a ROM (read only memory), a RAM (random access memory) and a Flash ROM. For the memory system (401), two of each PAM and ROM) are used. The memory devices are 8 bits wide, so one device is used for the lower and one is used for the upper 8 bits of the 16-bit data bus. Everything in the system is flash upgradeable. So the system or CPU starts up from a Boot ROM/EPROM, but first looks for a newer firmware version in the flash memory. If a newer version exists, the system goes on executing commands from the flash memory. The flash ROM can be updated on the card, through the system from a workstation (47), from a remote computer, or from the control panel (46), for example via an infrared link from a portable computer.

It is possible to use another processor type from this family. By changing two resistors connected to the EA pin of the CPU, it is possible to use a processor with internal flash and leave out the flash ROM's from the memory system. There is an interface on the digital card (44), which can be used for such an upgrade.

Programmable Logic Device and Transmitter/Receivers

During start-up the central processing unit programs a programmable logic device, or FPGA (402) in this embodiment, programmed over a serial interface. This device is connected to the data, address and control bus of the CPU. Programming this device by the CPU on every start-up makes sure that there is always the latest firmware in the FPGA.

To get a 16-channel communication to other units, four quad UARTs (403) are used on every module (41). These UARTs are also connected to the CPU data, address and control bus. Buffers may be used for driving such an amount of devices on the address bus.

The digital cards are fully bi-directional, i.e. all the input and output signals can be reversed by direction controller (408) (see FIG. 3), and a common card is used for a transmitter (43, 44) and a receiver (42, 44) switch module (41). The digital part (44) of the module recognizes in what way it has to act depending on one direction signal coming from the analogue part. When acting as a receiver module, the synchronization signals HS, VS, come in from the computer interface module (51) differentially. They are received by differential line receivers and converted into CMOS compatible signal levels. All sixteen HS and sixteen VS signals are then connected to the FPGA.

Crosspoint Switches on Digital Card

There are two bi-directional 16 by 16-crosspoint switches embodied by the FPGA (402). Both are switched simultaneously for distributing HS and VS synchronization signals always together on one channel or communication link. These crosspoint switches are controlled by the CPU (400). The logic device is accessed by a data bus (406), an address bus (405) and some control signals (407). This interface is compatible to a standard microcontroller interface. A serial control link could also be used.

Figure 3A:
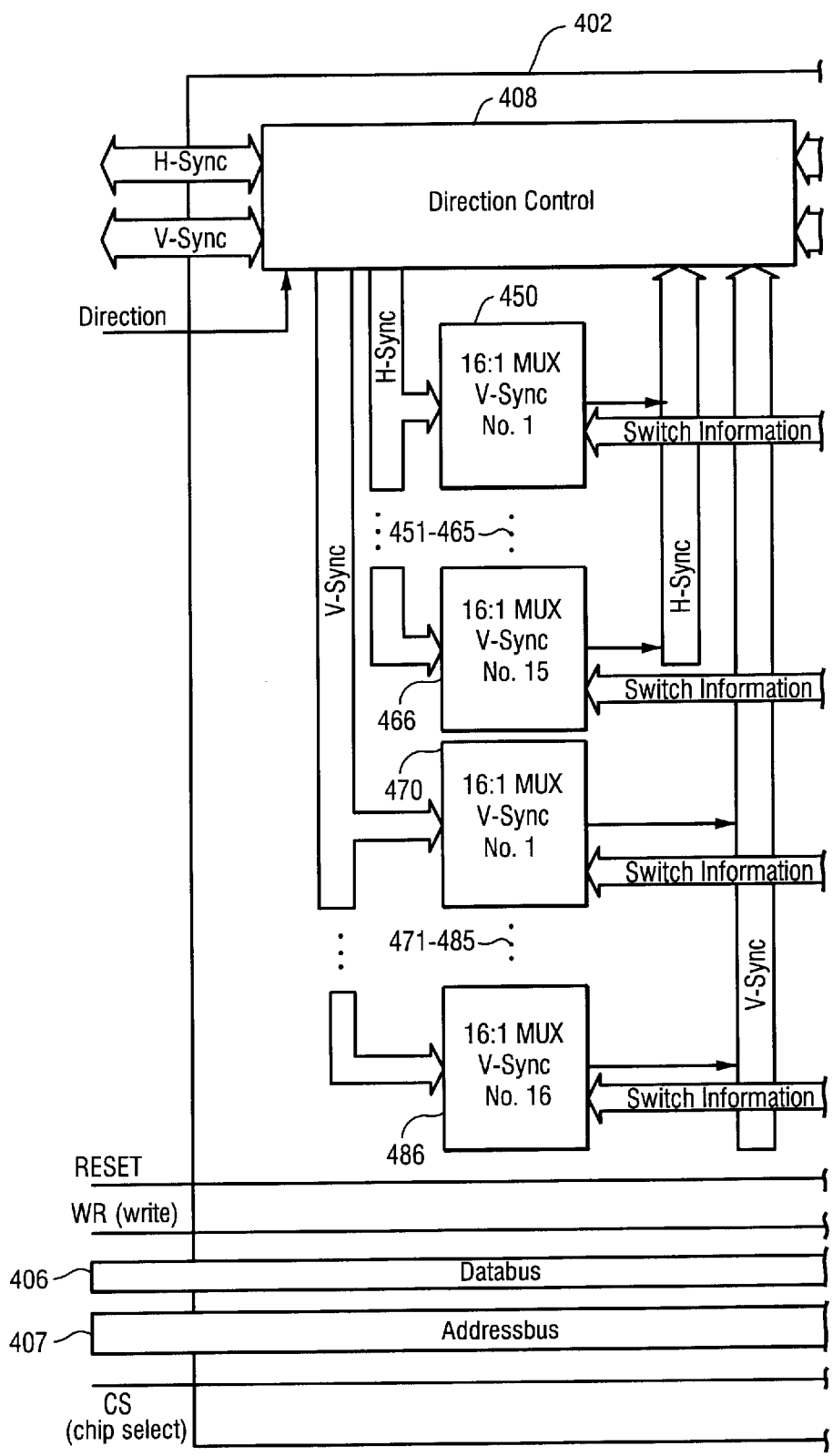
FIGS. 3A-3B are together a block diagram of the field programmable gate array (FGPA) and crosspoint switch arrangement of the digital card shown in FIG. 2.
Figure 3B:
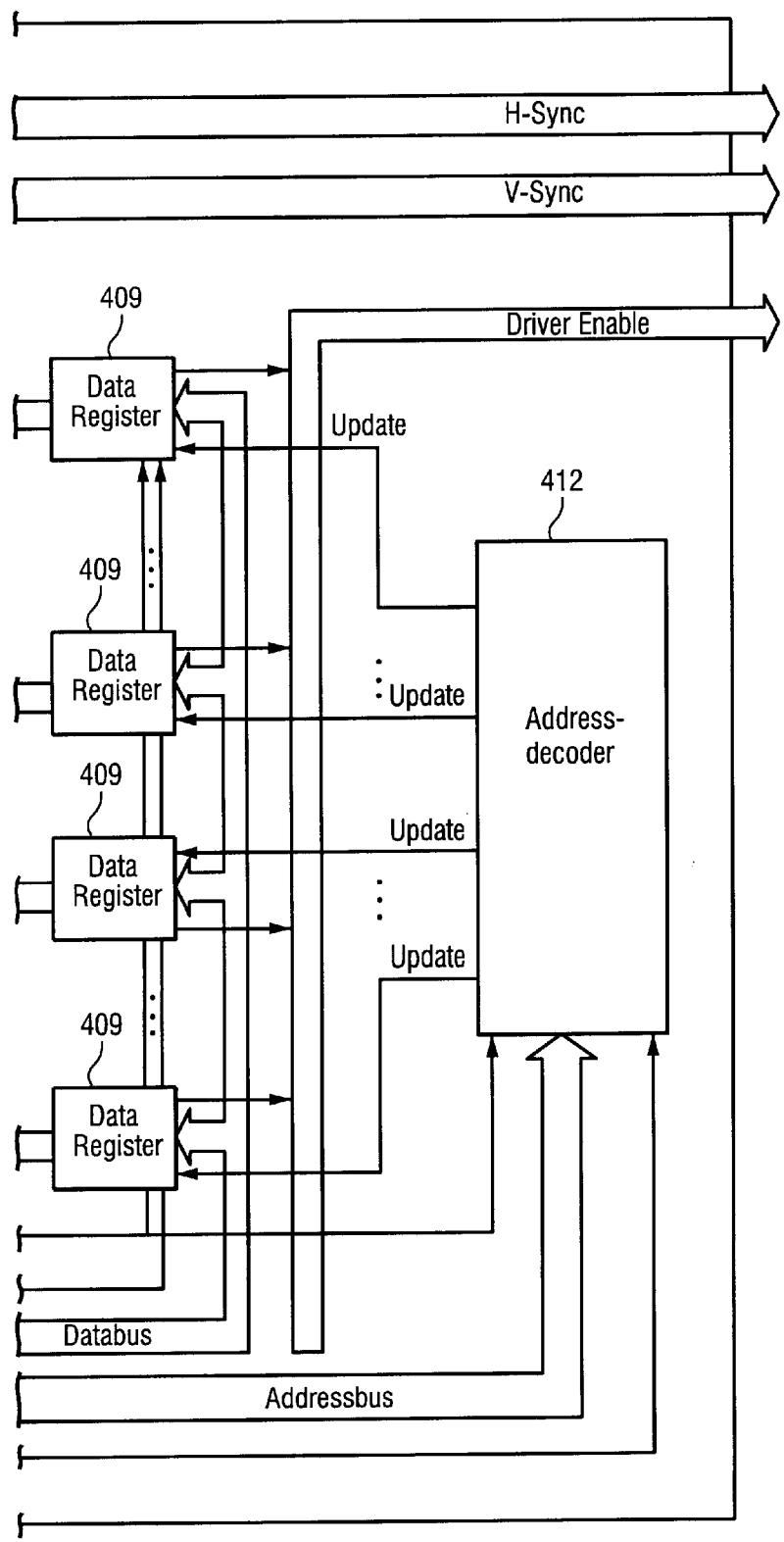

FIG. 3 shows the FPGA (402) and crosspoint switch arrangement in more detail, which comprises from sixteen (16 by 1) multiplexers (450–466) for the HS and from sixteen (16 by 1) multiplexers (470–486) for the VS synchronization signals. The sixteen inputs of each group of multiplexers are connected together. The outputs of the multiplexers go out of the device again. With this arrangement, two 16 by 16 crosspoint switches are gene rated.

When a connection is demanded by a user interface module, the CPU (400) selects one of the sixteen multiplexers with its coding on the address bus. The data bus will carry the information which one of the sixteen inputs will forward to the output of the multiplexer. There is one 5-bit data register for every pair of multiplexer (HS and VS), which stores the switching information and keeps the connection. Data registers (409) are updated with information from the data bus (406), when the address register recognizes a legal address and an update signal is sent to the corresponding data register. Connections could be released in the same way with the data bus on a low level on every signal. The switching information is stored in the FPGA (402) when the device is selected with the chip-enable signal and the write signal goes low and rises again. The reset line will clear all connections. It is the same when the system is powered up again. The FPGA is programmed by the CPU (400). It will be automatically updated when the firmware of the CPU is updated.

Low Voltage Differential Transceivers (LVDS)

When the synchronization signals are routed through the crosspoint switch (402) they are routed to sixteen transceivers. These low voltage differential signal (LVDS) transceivers (410) provide the synchronization signals to the backplane (45). In this embodiment, a LVDS transceiver is used because of reduction on electromagnetic interference (EMI) and also to keep the crosstalk between these and other signals low. The LVDS driver could be reversed with the direction signal provided by the analogue card.

In the reverse direction, when the digital card (44) acts like a transmitter, the LVDS transceiver (410) receives differential synchronization signals from the backplane, converts them into CMOS compatible signal level and forwards them to the FPGA crosspoint switch (402). This device will route the signals as needed for the user and outputs them to a CAT5 (Category 5 computer network cable) driver output section (411) again. These differential drivers (See FIG. 2) are in parallel to the receivers for the reverse direction and are controlled by the direction signal coming from the analogue card. There is only one of the parallel drivers active at one time. The differential input or output from the CAT5 side are connected to the differential line receiver of the type 26C32 and are also connected to the differential line driver of the type 26C31. The signal T/R (transmit/receive) determines the direction information. The driver is active when this signal is on a low level because it is connected to the positive enable pin of the driver. The T/R signal is also connected to the low active enable signal of the differential line receiver and in case of an active driver this receiver will be inactive and vice versa.

Communication Links

The external system communication is based on differential signals. The previously prepared data packages, as prepared by the user or computer interface modules (17, 51) are received by differential line receivers at the CAT5 cable inputs. It should be noted that this communication is based on a full duplex proprietary communication protocol.

Universal Asynchronous Receive Transmit Modules (UARTs)

Incoming data packages are converted to a CMOS-compatible signal level and then forwarded to the UART (403) inputs. For the sixteen communication links, four quad UARTs (403) are used. These UARTs are full duplex as well, and transmit and receive at the same time. The serial data is converted into parallel data and stored in a FIFO (first in first out) memory. The UART incorporates a 16-byte FIFO for every communication path. The CPU, which is connected to the UARTs via data, address and control buses (405, 406, 407) then has access to these bytes. The CPU will be informed by interrupt signals when bytes arrive. The UARTs will also report reception errors or transmission errors to the CPU (400).

In the reverse direction, when the digital card (44) acts like a transmitter, the CPU stores data bytes for external bus transmission in the UART. These data bytes are serialized and output to the CAT5 driver section (411) by the UART. To access the UARTs, the data bus and the address bus are used. To generate the 16-chip select signal, only one chip select signal is used from the CPU. The others are generated by an address decoder (412) which is built up from two 1 by 8 demultiplexers (See FIG. 3). Therefore three lower address lines are connected to the UARTs themselves and four additional higher address lines are connected to the decoder devices. The driver converts the CMOS signal into a differential signal and outputs it to the CAT5 connectors.

The CPU which receives and transmits all the data from and to the UARTs forwards all information with other destinations to the internal system bus which is located on the backplane (45). This system bus is based on the CAN bus. The integrated CAN module (404) of the CPU is used for this. All serial CAN data is output to a dedicated CAN driver (413) which converts the signals into differential signals. The CAN system bus runs at a speed of 1 mhz, for example. In this way all the modules communicate with each other.

Handling of the CAN Bus Protocol

CAN bus data packages which are for a particular module are handled by the CPU in that module. In case of switching information it will send switching commands to the FPGA crosspoint switch (402), to the analogue video crosspoint switch (501, 502) and enable signals to the video buffers. For enabling the video buffers a serial synchronous interface (500) is used. This interface (500) to the respective analogue card (42, 43) is separated by optocouplers to prevent noise on the analogue card. This serial data is converted into sixteen parallel enable signals for the video buffers. The six video crosspoint switches are controlled in the same way. The serial synchronous data is clocked into the crosspoint switches. This interface is also opto-isolated to prevent high frequency digital noise in the analogue portion of the system.

Front Control Panel

The front control panel (46) which is also connected to the internal CAN bus (414) will provide configuration information to the switch modules. This could be information like memory update information for the CPUs of the other switch modules (41). The chassis address for this unit could be set with the control panel and it will be forwarded to other cards which need the information.

The front panel (46) could also be used as an interface for debugging the system. In this case the panel may be used to monitor the internal communication bus (CAN) and forward the information to a display or to a computer (47) connected via serial port to the panel. If needed the developer or user can read in or send out commands and data.

The control panel may also be used to monitor the primary and redundant power supply units (601, 602), and give a warning of voltage drops or power failures. It may also be used for monitoring the temperature in the system housing and will give an alarm in the case of overheating.

The user interface of the control panel may be a graphic display with a touch panel to enter commands and set up the system, or a character display with buttons or switches to enter information.

Redundant Power Supplies

The system most preferably includes two independent, fully redundant power supply units. If one power supply (601) fails the other one (602) will guarantee a stable system which will go on working without interruption. The power supplies are monitored by the control panel.

Hot Swap

Every replaceable module in the system is most preferably designed to be "hot swappable". Every single module, e.g. power supplies (601, 602), fan modules (603, 604), all switch modules (41), and the control panel (46), could be plugged or unplugged in a powered on condition without interruption of system function. The novel modular design of the switch modules (41) allows each of these to be individually hot-swappable, a most advantageous feature of the invention.

Figure 4:
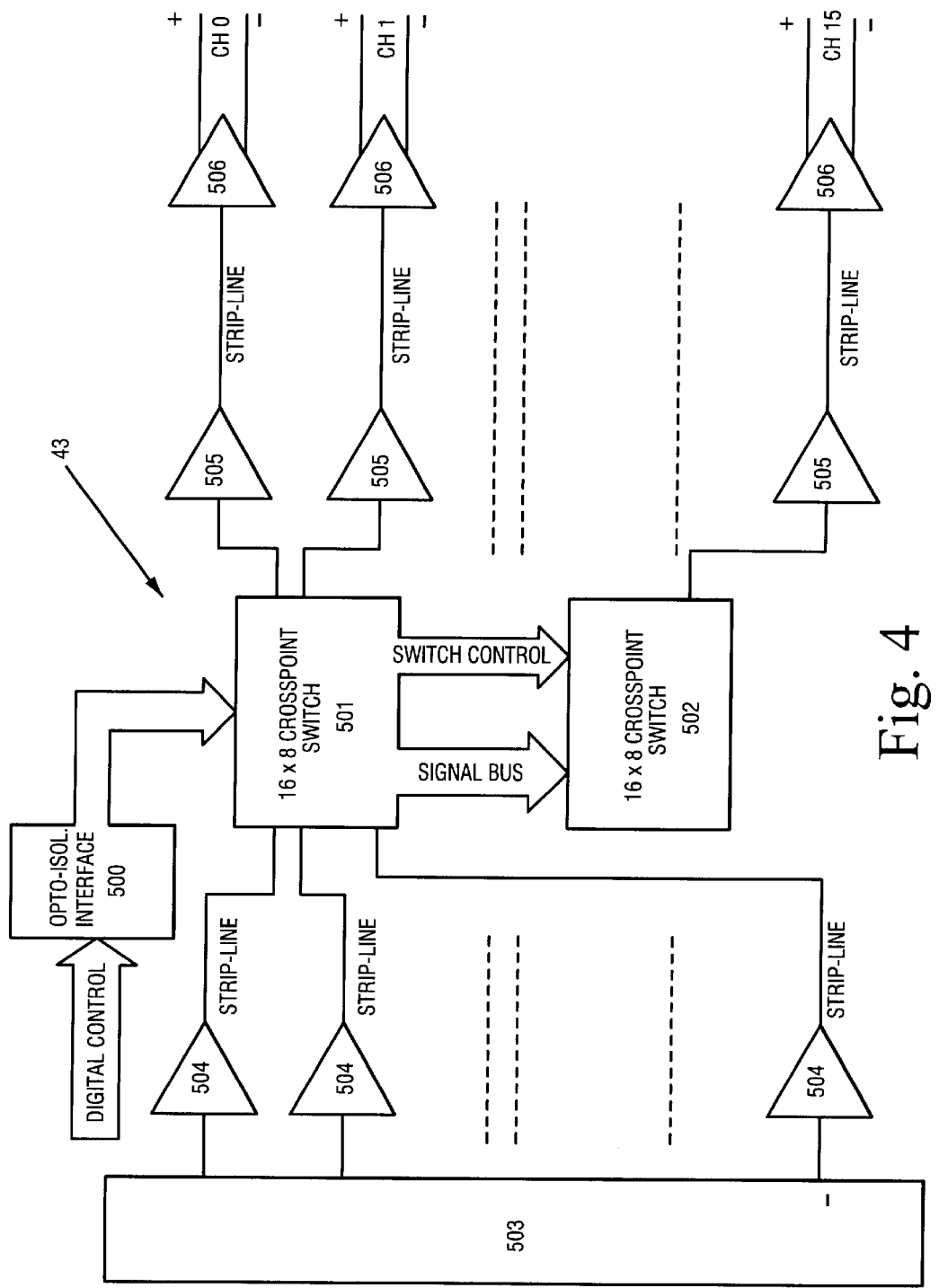
FIG. 4 is a block diagram of an analogue transmitter card, comprised in a switch module of the system shown in FIGS. 1A-1C.

Analogue Transmitter Card (FIG. 4)

The transmitter switch module (43, 44) consists of an analogue transmitter card (43) "stacked" on top of the digital card (44), as described above. Each input stage of the transmitter card presents a high impedance to the backplane analogue bus thereby causing negligible loading and maximizing signal integrity.

The analogue transmitter card is connected to the backplane analogue bus using, for example, a HDM plus daughtercard connector assembly (503), as supplied by Teradyne Inc.

The length of the printed circuit board (PCB) track between the connector and the input buffer amplifier (504) has been kept as short as possible in order to minimize stray parasitic capacitance and thereby maximize channel bandwidth. The output of this amplifier directly drives (i.e. the transmission line is only terminated at the far end by its characteristic impedance) a controlled impedance transmission line implemented by a stripline structure embedded in the PCB structure during manufacture. This stripline has a nominal impedance of 50Ω+/−15%. The termination for this section of stripline is placed as close as possible to a 16×16 analogue crosspoint switch, which may comprise two 16×8 Buffered Video Crosspoint Switches (501, 502) per analogue signal (red, green, blue), for example, product part AD8110 by Analog Devices, Inc. In order to build a 16×16 non-blocking matrix the sixteen single-ended high impedance inputs of both devices are connected in parallel thus forming a 16×16 crosspoint matrix switch. Therefore to implement a 16×16 non-blocking crosspoint matrix for all three analogue signals (red, green, blue) requires six AD8110 devices (501, 502) in this embodiment of the invention.

Control signals from the corresponding and adjacent digital card (44) in the switch module (41) are supplied to the analogue transmitter card (43) as serial data via a stacker connector. In order to minimize the coupling of conducted digital "noise" from the digital card to the analogue circuits all control signals are "galvanically isolated" using opto-isolators (500), in a known manner. On the analogue side of the opto-isolated barrier this serial data stream is fed directly to the analogue crosspoint switches and determines the signal routing within the crosspoint switch. The selected active crosspoint output is buffered immediately by a wide-band monolithic amplifier (505). This buffer directly drives a section of "stripline" similar to that described earlier.

This stripline section carries the routed signal to a correctly terminated input stage of discrete differential amplifier stage (506). This differential amplifier stage provides the single-ended to balanced conversion. This stage also provides switched "pre-emphasis". The pre-emphasis applied here in conjunction with the equalization in the analogue receiver provides a means to accommodate a wide range of CAT5 cable lengths. The balanced signal is connected to the respective RJ45 by a section of balanced stripline with a nominal 100Ω differential impedance.

Method of Operation of the Backplane Analogue Bus

Controlled impedance "stripline" techniques have been used in the design of the analogue video bus portion of the backplane in order to optimize signal integrity, channel bandwidth and crosstalk separation. The analogue backplane bus consists of sixteen "Double Matched" transmission lines, (i.e. terminated at both ends by its characteristic impedance) implemented in a "stripline" structure with a loaded impedance of approximately 50Ω. Thus the effective input impedance at any point along this transmission line is 25Ω.

Figure 8:
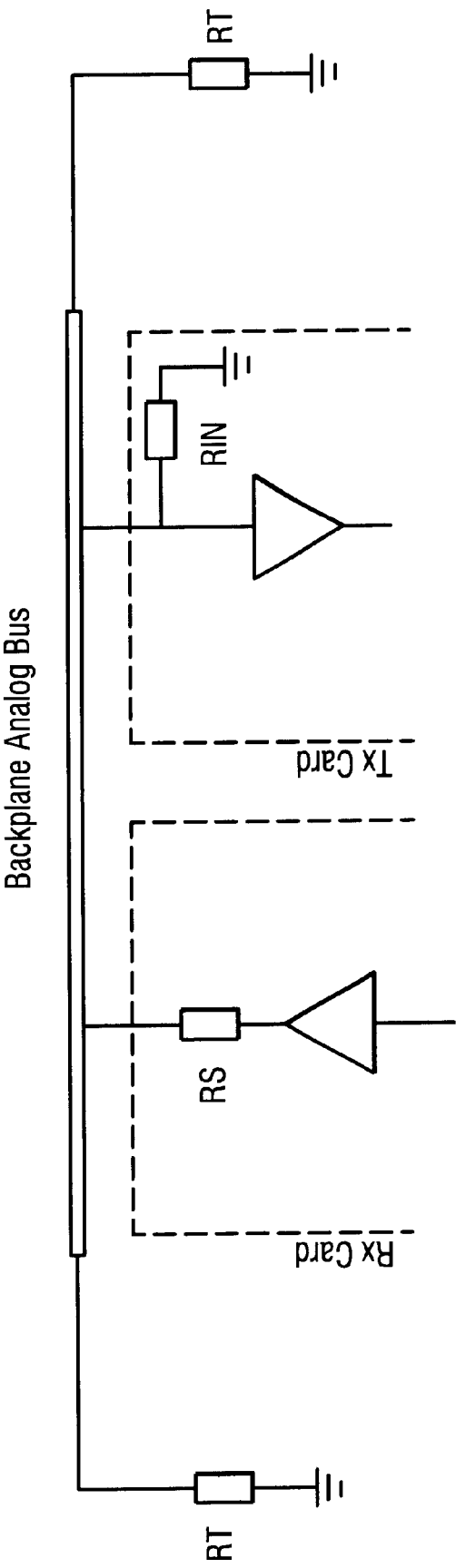
FIG. 8 shows further aspects of the analogue backplane interface shown in FIGS. 4 and 5.

The analogue bus driver device in the receiver card drives this backplane with a nominal 25Ω source impedance. This matched impedance approach minimizes ringing on fast signal edges, (See FIG. 8).

Figure 9:
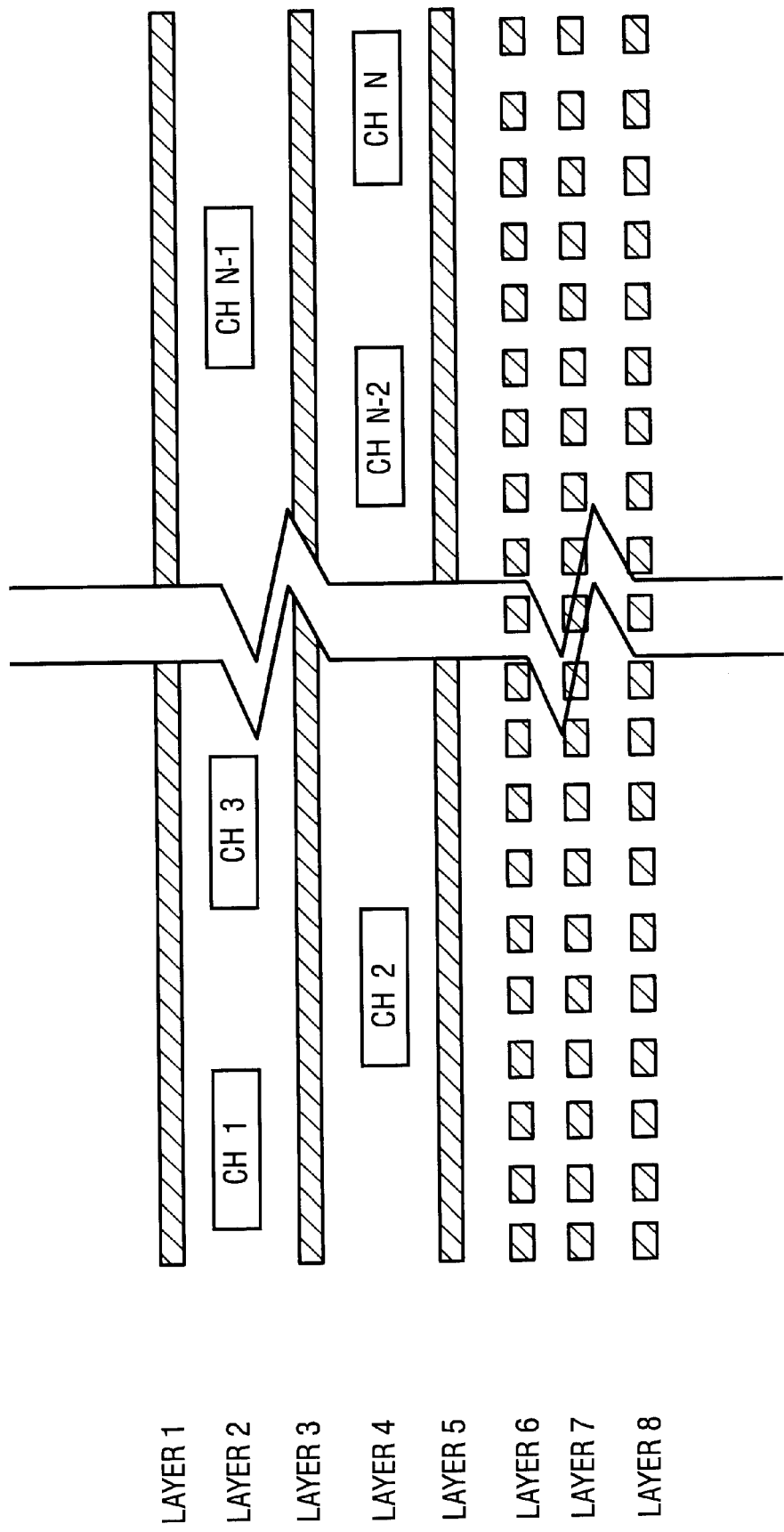
FIG. 9 shows an example of an alternate tri-plate stripline structure, described with reference to the analogue circuits shown in FIGS. 4 and 5.

Adjacent channel crosstalk is reduced by interleaving adjacent channel paths in an alternate tri-plate stripline structure, i.e. all even channels are carried in one stripline structure and all odd channels are carried in another offset structure. Expanding on the above technique additional stripline structures may be used to further enhance the separation between channels thus further improving the crosstalk separation, (See FIG. 9).

Figure 7:
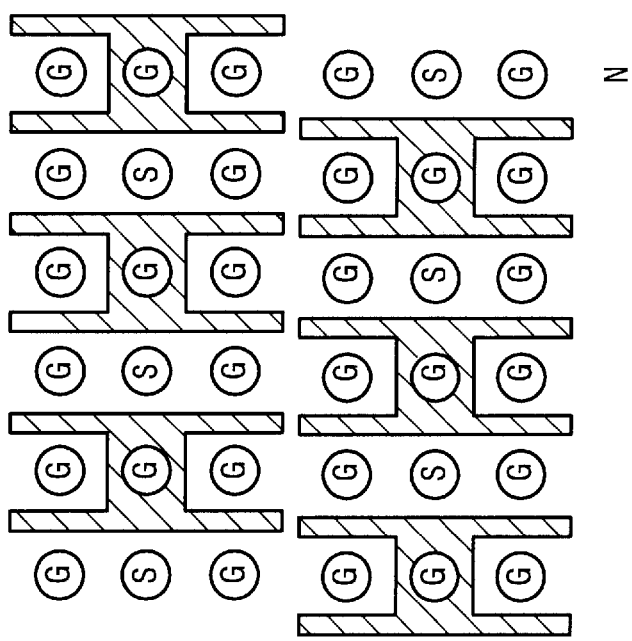
FIG. 7 shows a portion of a backplane connector pin assignment, illustrating a shielding technique.
Figure 7:
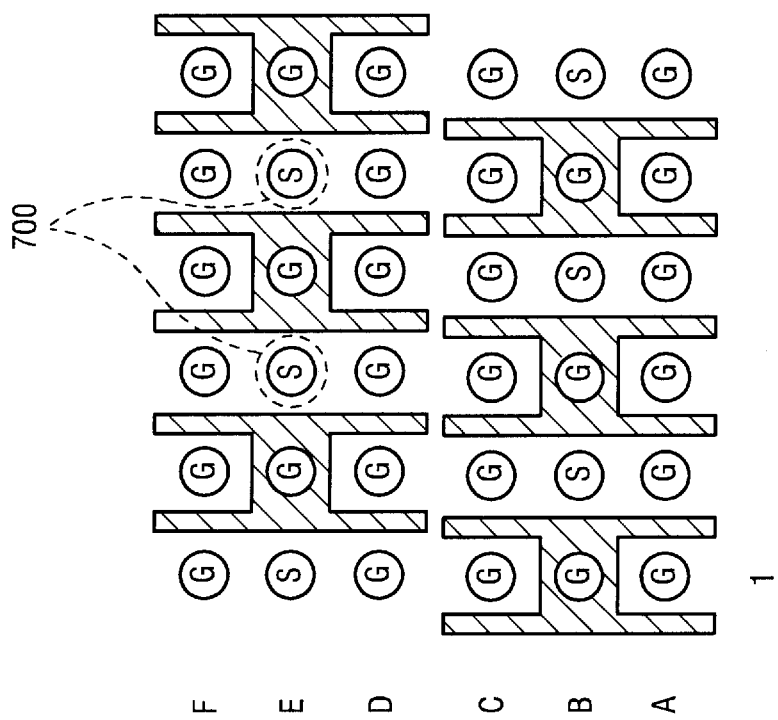

In order to maintain maximum system bandwidth and optimal crosstalk separation, special consideration has been given to the choice of interconnect technology employed. The connector chosen is preferably from the HDM plus range manufactured by Teradyne, Inc. This connector has an integral stripline structure and is optimized for controlled impedance environments between 50Ω and 60Ω. A specific pin assignment is used with this connector in order to maximize the crosstalk separation between channels, (See FIG. 7).

This pin assignment creates a "pseudo-coaxial cavity" (700) defined by ground pins (701) surrounding each analogue signal path (702) within the mated connector body thereby resulting in optimal crosstalk separation.

Figure 5:
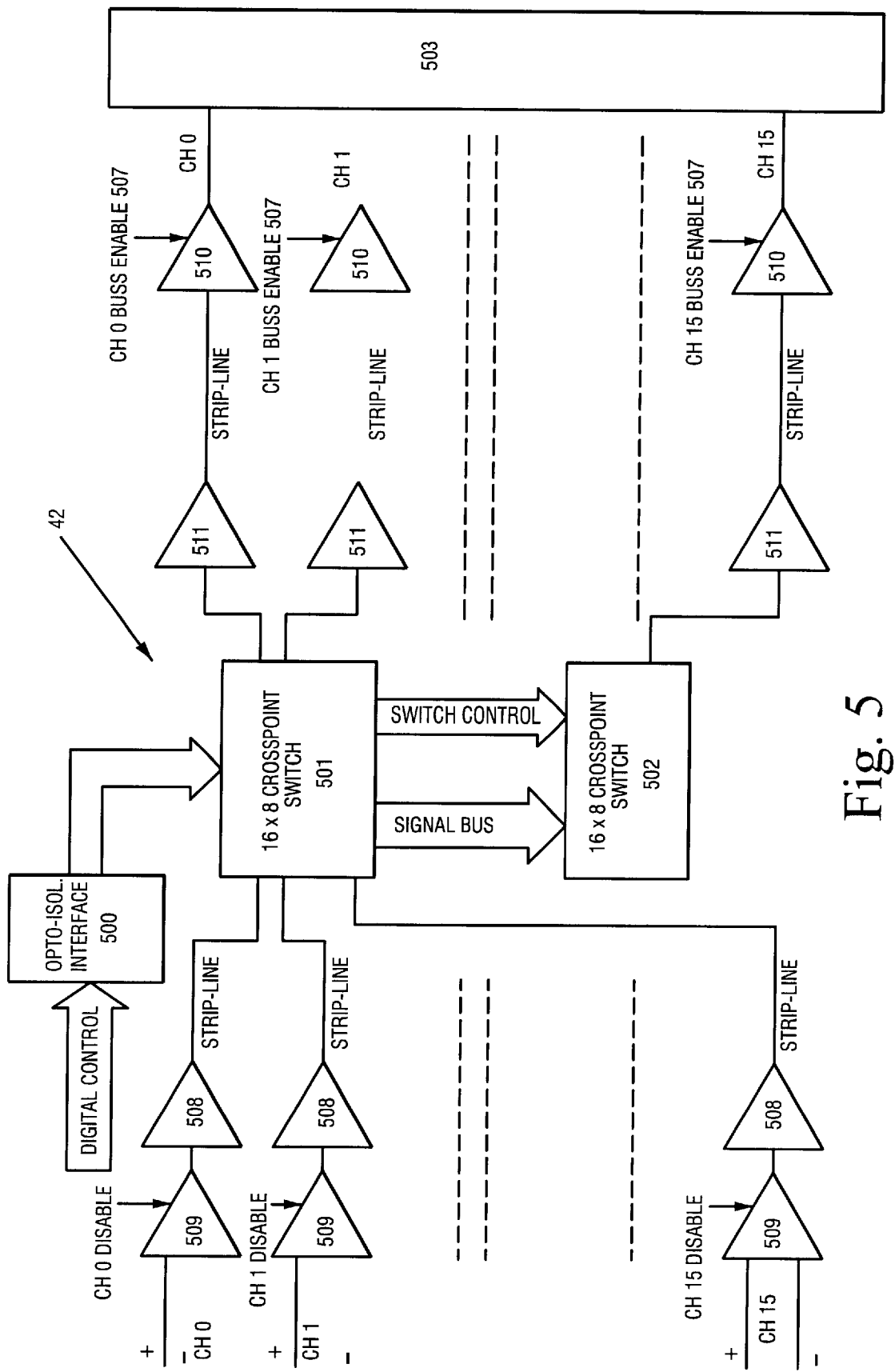
FIG. 5 is a block diagram of an analogue receiver card, comprised in a switch module of the system shown in FIGS. 1A-1C.

Analogue Receiver Card (FIG. 5)

The receiver switch module (42, 44) consists of an analogue receiver card (42) "stacked" on top of the digital card. Red, green, blue and HS synchronization information are presented to the analogue receiver card as electronically balanced or differential signal pairs. VS synchronization information, along with keyboard and mouse signals are routed directly to the digital card (44) underneath. Each channel or above signal group are accommodated in one CAT 5 cable assembly terminated in an RJ 45 connector. The balanced HS synchronization signal is directly routed internally to the digital card via the stacker connector. The analogue receiver does not perform any operation on this signal.

The remaining differential red, blue and green signals are routed from the RJ4S connectors to the input stages by balanced stripline with a nominal 100Ω differential impedance, where they are converted to single-ended signals by discrete differential amplifier stages (509). Each differential amplifier incorporates switched cable equalization in order to compensate for the progressive high frequency roll-off with increasing length of CAT5 cable used and therefore "flatten" the frequency response.

In order to reduce power consumption inactive or unused differential amplifier input stages have powerdown capability whereby the power supply voltage is removed from the stage. This also reduces internal heat produced from unused input stages that are turned on.

The control signals required to provide the enable/disable function are derived from the serial data stream. This control information is extracted using two 8-bit shift registers and controls the discrete input differential amplifier stages directly.

The output signal is then buffered by a monolithic amplifier (508) whose output directly drives (i.e. the transmission line is only terminated at the far end by its characteristic impedance) a controlled impedance transmission line implemented by a stripline structure embedded in the PCB structure during manufacture. This stripline has a nominal impedance of 50Ω±/−15%. The termination for this section of stripline is placed as close as possible to the 16×16 analogue crosspoint switch (501, 502), similar to that described above for the transmitter card.

A crosspoint switch topology based on "switched transconductance architecture" has been chosen over the more common "bilateral mosfet switch" type of device. The particular crosspoint switch used consists of an array of 128 transconductance input stages organized as eight 16:1 multiplexers with a common, 16-line analogue input bus. Each multiplexer is basically a folded-cascode high-speed voltage feedback amplifier with sixteen input stages. This architecture results in a low-power large matrix crosspoint switch with high input resistance, low input capacitance and wide bandwidth without the use of additional input buffers.

Therefore to implement a 16×16 non-blocking crosspoint matrix for all three analogue video signals (red, green, blue) requires six AD8110 devices in the present implementation of the invention. Control signals from the digital card underneath are supplied to the analogue receiver PCB as serial data via the stacker connector. In order to minimize the coupling of conducted digital "noise" from the digital PCB to the analogue circuits all control signals are "galvanically isolated" using opto isolators. On the analogue side of the opto-isolated barrier this serial data stream is fed directly to the analogue crosspoint switches and determines the signal routing within the crosspoint switch. The selected active crosspoint output is buffered immediately by a wideband monolithic amplifier (511). This buffer directly drives a section of "stripline" similar to that described earlier. This stripline section carries the signal to the correctly terminated input stage of the "backplane analog bus" diver circuit (510) located close to the HDM plus daughtercard connector (503). This placement is necessary in order to keep the unterminated "stub" length short when the bus driver is disabled. The analogue transmitter card (42) is connected to the backplane analogue bus using a HDM plus daughtercard connector assembly, as described above.

In the present embodiment of the invention the analogue bus driver used is a MAX4223EUT-T device, supplied by Maxim. This device has an output disable function which is activated by "pulling" a shutdown control pin (SHDN) low (507).

Therefore a particular channel output is effectively "wire-OR'ed" with the same channel outputs on another receiver card or cards in the same chassis thereby giving each card's output access to the common backplane analogue bus. The control signals required to provide the enable/disable function are also derived from the serial data stream. This control information is extracted in a similar manner to that described for the differential input stages using a further two 8-bit shift registers and controls the analogue bus drivers directly.

While the invention has been particularly shown and described with reference to embodiments thereof, those skilled in the art will understand that the foregoing and other changes in form and detail may be made therein without departing from the spirit and scope of the present invention.

What is claimed is:

1. A switching system for interconnecting a plurality of computer user terminals, having user interface devices including a keyboard, a video display unit and a cursor control device, with a plurality of computers in a computer network, allowing a user to access any one or more of said computers from the user interface devices or a single terminal, comprising:
   a switching hub for routing keyboard and cursor control signals transmitted from any one of the terminals to a selected computer, and for routing video signals received from the said computer to said one of the terminals, said signals being in both digital and analogue form,
   a user interface module for receiving said transmitted keyboard and cursor control signals, coupled between said plurality of computer user terminals and said switching hub,
   a computer interface module for receiving said received video signals, coupled between said plurality of computers and said switching hub,
   wherein the physical architecture of the switching hub includes a modular system comprising a plurality of hot swappable switch modules, each module comprising an analogue transmitter circuit and/or an analogue receiver circuit, each including an analogue crosspoint switching arrangement, a programmable digital circuit for handling digital data signals and including a digital crosspoint switching arrangement, and a backplane interface between the said analogue and digital circuits.

2. A switching system according to claim 1, in which the digital circuit of each switching module comprises its own central processing unit adapted to provide distributed control of each switch module in the switching system.

3. A switching system according to claim 1, in which the digital circuit is bi-directional and is adapted to handle received or transmitted digital data signals, and is common to all switch modules.

4. A switching system according to claim 1, in which each switch module is configured as either a transmitter module or a receiver module.

5. A switching system according to claim 1, wherein each switch module provides access to a pre-determined number of computer user terminals or computers.

6. A switching system according to claim 1, in which the horizontal synchronization (HS) and vertical synchronization (VS) parts of the video signal are digitally encoded and handled by said digital circuit.

7. A switching system according to claim 1, in which internal communication between the an analogue transmitter or receiver circuit and the digital circuit is via an internal system bus.

8. A switching system according to claim 7, wherein the internal system bus is a differential controller area network (CAN) bus.

9. A switching system according to claim 1, in which the analogue crosspoint switching arrangement comprises a switch topology based on a switched transconductance architecture.

10. A switching system according to claim 9, in which the analogue crosspoint switching arrangement comprises a low power, large matrix crosspoint switch with high input resistance, low input capacitance and wide bandwidth.

11. A switching system according to claim 10, in which the analogue crosspoint switching arrangement comprises a plurality of multiplexers, each comprising a folded-cascode high-speed voltage feedback amplifier.

12. A switching system according to claim 1, wherein the digital crosspoint switching arrangement comprises a field programmable gate array.

13. A switching system according to claim 12, wherein the digital crosspoint switch arrangement is controlled by the central processing unit on its switch module, via separate address, data and control buses.

14. A switching system according to claim 1, wherein communication between the digital crosspoint switch arrangement and the backplane is via a differential transceiver, preferably a low voltage differential driver/receiver.

15. A switching system according to claim 5, wherein each switch module can handle sixteen video channels, such that a minimum of eight switch modules will allow sixteen computer user terminals to access 128 computers in a non-blocking way.

16. A switching system according to claim 15, wherein the digital crosspoint switching arrangement comprises two bi-directional 16×16 gate arrays adapted simultaneously to handle respective HS and VS signal data, pertaining to one video channel.

17. A switching system according to claim 16, in which the analogue crosspoint switching arrangement comprises an array of 128 transconductance input stages organized as eight 16×1, or two 16×8, multiplexers with a common, 16-line analogue input bus.

18. A switching system according to claim 1, in which each multiplexer switching hub further comprises a programmable control panel module in communication with the backplane for system reconfiguration, and display of status information.

19. A switching system according to claim 18, in which the control panel module is adapted to interface with a remotely-linked input/output device, linked via infrared or radio, and/or is adapted to interface with a remotely-located computer user terminal.

20. A switching system according to claim 1, in which each switch module, is adapted to be hot-swappable.

21. A switching system according to claim 1, further comprising a fully-redundant power supply comprising multiple power supply units wherein each power supply unit is adapted to be hot-swappable.

22. A switching system according to claim 1, further comprising multiple cooling fan modules, wherein each cooling fan module is adapted to be hot-swappable.

23. A switching system according to claim 1, for interconnecting a plurality of computer user terminals, having user interface devices including a keyboard, a video display unit and a cursor control device, with a plurality of computers in a computer network, allowing a user to access any one or more of said computers from the user interface devices or a single terminal, comprising:

a switching hub for routing keyboard and cursor control signals transmitted from any one of the terminals to a selected computer, and for routing video signals received from the said computer to said one of the terminals, said signals being in both digital and analogue form,
   a user interface module for receiving said transmitted keyboard and cursor control signals, coupled between said plurality of computer user terminals and said switching hub,
   a computer interface module for receiving said received video signals, coupled between said plurality of computers and said switching hub.

24. A switching system according to claim 23, in which the analogue crosspoint switching arrangement comprises a low power, large matrix crosspoint switch with high input resistance, low input capacitance and wide bandwidth.

25. A switching system according to claim 24, in which the analogue crosspoint switching arrangement comprises a plurality of multiplexers, each comprising a folded-cascode high-speed voltage feedback amplifier.

26. A switching system according to claim 25, in which the analogue crosspoint switching arrangement comprises an array of 128 transconductance input stages organized as eight 16×1, or two 16×8 multiplexers with a common, 16-line analogue input bus.

27. A switching system for interconnecting a plurality of computer user terminals, having user interface devices including a keyboard, a video display unit and a cursor control device, with a plurality of computers in a computer network, allowing a user to access any one or more of said computers from the user interface devices or a single terminal, comprising:

a switching hub for routing keyboard and cursor control signals transmitted from any one of the terminals to a selected computer, and for routing video signals received from the said computer to said one of the terminals, said signals being in both digital and analogue form;
   a user interface module for receiving said transmitted keyboard and cursor control signals, coupled between said plurality of computer user terminals and said switching hub;
   a computer interface module for receiving said received video signals, coupled between said plurality of computers and said switching hub;
   wherein the switching hub comprises a plurality of removable and hot swappable switch modules each with its own crosspoint switching arrangement and central processing unit, each module comprising an analogue transmitter circuit and/or an analogue receiver circuit, a programmable digital circuit for handling digital data signals, and a backplane interface between the said analogue and digital circuits.

28. A switching system for interconnecting a plurality of computer user terminals, having user interface devices including a keyboard, a video display unit and a cursor control device, with a plurality of computers in a computer network, allowing a user to access any one or more of said computers from the user interface devices or a single terminal, comprising:

a switching hub for routing keyboard and cursor control signals transmitted from any one of the terminals to a selected computer, and for routing video signals received from the said computer to said one of the terminals, said signals being in both digital and analogue form,
   a user interface module for receiving said transmitted keyboard and cursor control signals, coupled between said plurality of computer user terminals and said switching hub,
   a computer interface module for receiving video signals, coupled between said plurality of computers and said switching hub,
   wherein the switching hub is a module system comprising a plurality of switch modules, each module comprising a separate analogue transmitter circuit or an analogue receiver circuit, each including an analogue crosspoint switching arrangement, a separate programmable digital circuit for handling digital data signals and including a digital crosspoint switching arrangement, and a backplane interface between the said analogue and digital circuits, said analogue circuit embodying stripline structures for video bus channel paths.

29. A switching system according to claim 28, in which adjacent channel paths are interleaved in an alternate triplate stripline structure, with even channels carried in one stripline structure and odd channels carried in the next adjacent stripline structure.

30. A switching system according to claim 28, in which the backplane is interconnected to the analogue circuit with a specific pin assignment wherein each analogue signal carrying pin is encircled by pins to ground thereby creating a pseudo-coaxial cavity for each analogue signal pathway within the mated backplane connector portion, for optimal crosstalk separation within said connector portion.

31. A switching system according to claim 28, in which galvanic isolation is incorporated in all interface paths between the analogue circuit and the digital circuit, preferably embodied by an opto-coupler.

* * * * *